Figure 1:
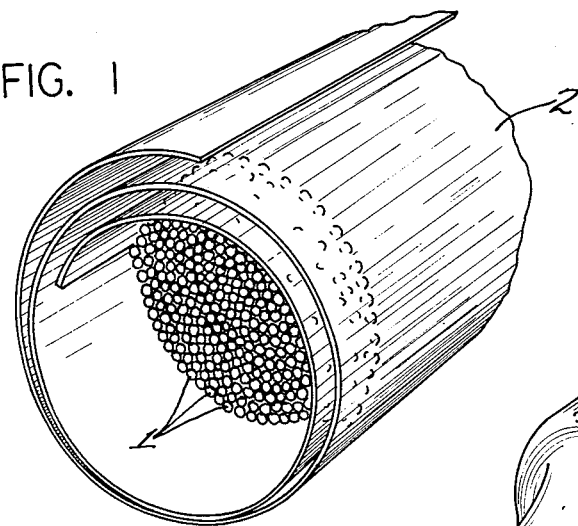

Nov. 23, 1965  T. J. DEEREN ETAL  3,218,764
FORMING SHORT-LENGTH GLASS TUBES, RODS AND THE LIKE
Filed Dec. 14, 1962

INVENTORS
THOMAS J. DEEREN
BY ALBERT D. LEWIS
E. J. HOLLER &
W. A. SCHAICH
ATTORNEYS

United States Patent Office 3,218,764
Patented Nov. 23, 1965

3,218,764
FORMING SHORT-LENGTH GLASS TUBES, RODS AND THE LIKE
Thomas J. Deeren, Maumee, and Albert D. Lewis, Toledo, Ohio, assignors to Owens-Illinois Glass Company, a corporation of Ohio
Filed Dec. 14, 1962, Ser. No. 244,653
9 Claims. (Cl. 51—283)

This invention relates to a novel method of cutting long thin tubes or rods of hard material such as glass into individual short segments and more particularly to a method of cutting relatively small-diameter glass tubes into diminutive tubulations having substantially uniform size and shape.

In the manufacture of many electronic devices such as vacuum tube envelopes, it is necessary that a short length of small-diameter glass tubing be attached to the envelope to facilitate its evacuation. It is necessary that the tubulation have a precise size and shape, particularly in view of the fact that such tubulations are frequently attached by automatic or semi-automatic processes. It is a normal requirement that the tubulations have square-cut end surfaces substantially free of chips, cracks, and irregularities which may prevent satisfactory sealing to the envelope and thus inadequate evacuation of the completed device.

Heretofore in the manufacture of small-diameter extremely short-length tubulations, lengthy glass tubes have been severed by retaining the same in solidified "potting" material such as wax to prevent their movement during transverse cutting. Such operations are costly, requiring extensive cleaning of the severed segments prior to usage. This method is usually unsatisfactory for forming extremely short-length glass segments such as those having a length of one-eighth inch or less without producing the aforesaid flaws. Obviously, cutting lengthy sections of glass tubing into a plurality of short-length tubulations increases in difficulty with increased tendency of end defects to occur as shorter lengths are severed. However, the potting process involves considerable expense in loading and packing the long thin tubes in a hollow container such as a cylindrical paper sleeve and cleaning the severed segments. The usual process of forming exhaust tubulations involves forming a localized score in a selected exterior region of the thin tubes and applying a bending moment thereto to effect breakage of the tubes. This process frequently results in objectionable end surface defects and length variation. The present invention is directed to overcoming such inherent difficulties.

Accordingly, it is an object of the present invention to provide a novel method of forming short-length tubes or rods from lengthy sections of hard material such as glass by retaining a plurality of the lengthy sections in a tightly-restrained integral bundle utilizing an exterior layer of heat-shrinkable material to facilitate cutting of segmental sections.

Another object of this invention is to provide an expedient method of forming a multiplicity of similar diminutive glass tubes or the like having precise contours by retaining a plurality of long glass tubes within an enveloping film of heat-shrinkable material and heating the enveloping film to contract the same and draw the glass tubes into a tightly-restrained integral bundle to prevent their relative movement during shipping, cutting and re-shipping operations.

Another object of this invention is to provide a unique method of severing lengthy sections of small-diameter glass tubes into individual short-length tubulations having uniform end surfaces and dimensions by enclosing the tubes within a surrounding layer or covering of heat-shrunken plastic film and retaining the severed short-length tubes by an encircling band portion of the shrunken film subsequent to severance to facilitate cleaning and shipment of short-length tubulations.

Another object of this invention is to provide an economical method of forming short-length small-diameter glass tubes or rods having precisely uniform contours and square-cut ends requiring a minimum of cleaning following cutting with the retention means being capable of continued retention of the severed sections during subsequent cleaning and shipping.

The specific nature of this invention, as well as other objects and advantages will become apparent to those skilled in the art from the following detailed description taken in conjunction with the annexed sheets of drawings on which, by way of preferred example only, are illustrated the preferred embodiments of the invention.

Figure 2:
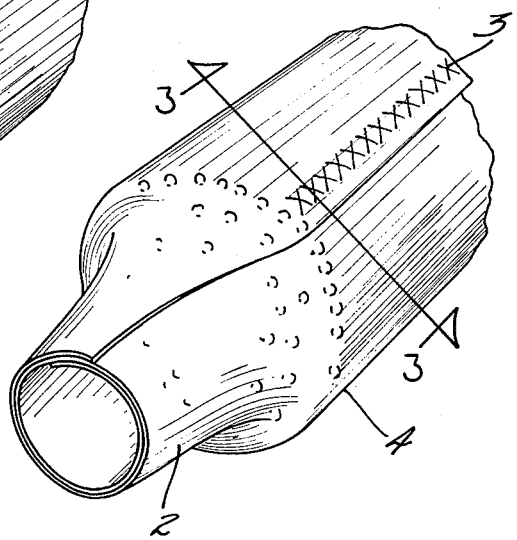
Figure 3:
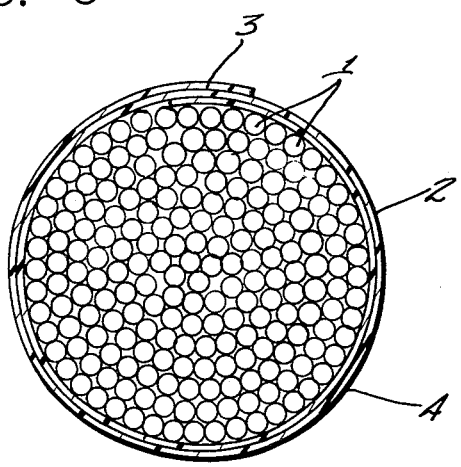
Figure 4:
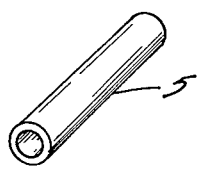

On the accompanying drawing:
FIG. 1 is a fragmentary perspective view of a plurality of lengthy glass tubes surrounded by an enveloping film or layer;
FIG. 2 is a similar perspective view of the enveloping film or layer shrunk in place around the plurality of tubes;
FIG. 3 is a sectional view taken along the line 3—3 of FIG. 2; and
FIG. 4 is a perspective view of an individual newly-severed glass tubulation.

The present invention may be briefly described as utilizable in the production of exhaust tubes, resistor cases and other small glass articles by precision cutting relatively short segments from suitable bundles of lengthy glass elements such as tubes. The bundles consist of a plurality of individual glass tubes drawn together into tangentially-contacting relation by an enclosing layer or layers of heat-shrinkable plastic film. The enveloping film is preferably employed having a greater longitudinal extent than the plurality of glass tubes of generally similar length. The enclosing film is heat-shrunk around the plurality of tubes to form a cylindrical-shaped integral bundle. The wrapped bundle of tubes is shipped from a drawing source to a cutting location. In severing segments of the integral bundle a liquid coolant is utilized during the severing operation employing an abrasive wheel, for example.

The present method described in greater detail is practiced by arranging a plurality of long glass elements 1 such as tubes or rods having essentially similar cross-sectional dimensions within an enveloping film 2 of heat-shrinkable plastic material. The illustrated tubes are taken in the form of a cylindrical bundle with their lineal axes parallel and their exterior surfaces in tangentially-contacting relation. Obviously the glass elements may have slightly varying diameters where they consist of cylindrical rods or tubes, although it is preferred that the elements have cross-sectional contours residing within precise dimensional ranges. The overall length of tubes 1 may vary although it is preferred that about 48 inch or greater lengths having a bow not exceeding ¼ inch be utilized in forming exhaust tubulations having square-cut ends.

Enveloping film or layer 2 of plastic material preferably consists of biaxially-oriented polyolefin material such as "Cryovac L" films manufactured by W. R. Grace and Co. This material is described as a biaxially-oriented irradiated polyethylene which is resistant to tear initiation, although tears once originated are easily propagated therethrough. The material has a heat-sealing range of from 275° to 500° F. and softens at 220° F. The material has a tensile strength of 8000 to 1600 p.s.i. with a seal strength of 60 to 100% of its tensile strength. The material is capable of substantial shrinkage on heating to provide durable positive restraint of enveloped articles.

Enveloping film 2 is taken in sheet form having a length substantially greater than glass tubes 1. Film 2 is wrapped around the cylindrical bundle of tubes to provide at least one and preferably at least two fully encompassing layers of the film. A longitudinal seam 3 is formed by a localized lineal application of heat extending throughout the length of glass tubes 1 to bond overlapping layers of the film lengthwise. The wrapped bundle is then subjected to sufficient heat of the order of 220° F. to shrink plastic film 2 around the plurality of glass tubes 1 to draw the same into tightly-constrained relation. The enclosed bundle is preferably passed through an open-ended oven so that the film is heated to not over about 250 to 300° F. in the case of "Cryovac L" polyolefin film so that the molecules are free to move and be reoriented causing substantial shrinkage. As shown in FIG. 2 the film shrinks considerably as shown by the illustrated end portion to retain the tubes in an integral bundle and as a unitary package. As stated, the enveloping film 2 is preferably applied to newly-formed glass tubes as they are collected into bundles at the discharge end of a tube drawing operation while all surfaces are clean and uncontaminated. Bundle 4 is then capable of being shipped over substantial distances and stored for lengthy periods as desired or required prior to segmental cutting.

In severing certain sizes of tubes one end portion of the shrunken film is removed from the bundle and the exposed adjacent ends of tubes 1 are immersed in paraffin wax or other potting material in liquid form which is then allowed to solidify to further restrain the tubes against relative lateral movement.

The cylindrical bundle 4 of glass tubes is then taken to a cutting operation and an abrasive element such as a rotating diamond wheel is utilized as the severing means. Where adjacent ends of the tubes at one end of the bundle have been bonded into an integral mass by the potting material, cutting of segmental sections is initiated at the other end of the bundle. A hydrocarbon cutting oil is utilized to cool the abrasive wheel or, alternately, water may be utilized during cutting of the prescribed lengths. Multiple or gang saws are also utilizable with the bundle 4 being firmly restrained during cutting.

Following cutting of the severed sections, the segmental section of cut lengths is retained by an encircling band portion of enveloping film 2. Continued retention of the cut lengths facilitates their being washed by water or other cleaning solutions such as solvents where hydrocarbon cutting oil is employed. Also ultrasonic cleaning may be used. The severed lengths exhibit smooth precisely-transverse end surfaces with their edges free from chips or fissures as compared with scored and broken end surfaces. This is primarily due to their being positively retaining against vibration, and relative lateral movement during the cutting operation. The encircling band of plastic film surrounding each circular severed section provides retention of the multiplicity of short-length severed tubes as an individual package to facilitate shipment of the tubes and their introduction into automatic and semi-automatic processes. Where the cleaning operation involves a reheating of the banding portion of plastic film to a temperature of 200° F. or more, for example, the banding is further heat-shrunk to draw the cut tubes into tighter tangentially-contacting relation. A single severed tubulation 5 is shown in FIG. 4.

Other types of enveloping film which are utilizable in the present method are polyvinyl chloride film which has been made from oriented cast solutions. Such products include polyvinyl chloride cast films, Product Nos. PVC521, 522, 524, 530, 541 and 620, manufactured by Reynolds Metals Co., Richmond, Va. These films are all capable of serving as heat-sealed envelopes and have excellent heat-shrinkability. The films are biaxially oriented with excellent resistance to most cleaning solutions. Also thermosetting forms of polyethylene such as "Irrathene" manufactured by General Electric Co., and formed by irradiation of polyethylene with high energy cathode-rays (electrons) are utilizable.

A sheet or cylindrical sleeve or expansible polystyrene plastic such as the material designated as "Dylite" and made in the form of beads by Koppers Company, Inc. can be used. These polystyrene beads contain a volatile liquid, i.e. pentane, as an expanding agent. Although a polymer of styrene is preferred in a case of such expansible material, any thermoplastic containing such a volatile liquid or solid chemical expansion agent, giving it the capability of being foamed upon the application of heat, can be used in the present method. A sleeve or preform of the material is slipped over a cylindrical bundle of the lengthy tubes. The sleeve or preform which is filled with the tubes is then subjected to a heat-treatment to expand the enveloping sleeve or preform both inwardly and outwardly. The inward expansion of the enveloping material by its foaming character permits firm retention of the tubes for severing as described above.

Various modifications may be resorted to within the spirit and scope of the appended claims.

We claim:

1. The method of cutting a multiplicity of short glass sections from long glass elements which comprises arranging a plurality of the long glass elements in parallel relation in a bundle, enclosing the bundle with at least one exterior layer of heat-shrinkable plastic film, subjecting said film to sufficient heat to draw said long glass elements into a tightly-restrained solid body, cutting said body along transverse lines to form segmental sections containing uniform short-length members surrounded by an encircling band of plastic film, and subsequently cleaning said segmental sections containing said short-length members while retained by said encircling band.

2. The method in accordance with claim 1 including the step of enclosing the said long glass elements with several layers of heat-shrinkable plastic film into a cylindrical-shaped bundle and forming a lineal seam by fusing an exterior portion of said film prior to subjecting said film to shrinking heat.

3. The method in accordance with claim 1 including the step of bonding adjacent ends of said long glass elements into an integral mass at one end of said tightly-restrained solid body with suitable bonding material to prevent longitudinal movement of said elements on severing of said segmental sections.

4. The method in accordance with claim 1 wherein said heat-shrinkable plastic film comprises biaxially-oriented irradiated polyethylene polymer.

5. The method in accordance with claim 1 wherein said severing is effected stepwise with a diamond wheel precisely normal to the axes of said glass elements.

6. The method of severing small-diameter long cylindrical lengths of glass tubing into a multiplicity of short-length tubulations having uniform size and shape, said method including the steps of arranging a plurality of said long cylindrical lengths of glass tubing in closely-adjacent parallel relation, enclosing said plurality of said glass tubing lengths with at least one enveloping layer of heat-shrinkable plastic film, forming a longitudinal joint at an exterior surface portion of said plastic film, subjecting said film to sufficient heat to contract said film and to draw said tubing lengths inwardly into a tightly-restrained integral bundle, joining adjacent ends of said glass tubing lengths with suitable bonding material into an integral mass at one end of said bundle, cutting said bundle transversely into a series of circular-segmentary cross-sections with an abrasive cutting element to separate said tubing lengths into prescribed short-length tubulations while retained by an encircling portion of said plastic film, and cleaning the short length tubulations while they are retained by the encircling portion of said plastic film.

7. The method in accordance with claim 6 including the step of reheating said severed short-length tubulations during said cleaning step to further shrink the encircling portion of said plastic film.

8. The method in accordance with claim 6 including the step of wrapping said plurality of glass tubing lengths into a cylindrical-shaped bundle with at least several layers of heat-shrinkable plastic film having a longitudinal dimension greater than said tubing lengths.

9. The method in accordance with claim 6 including the steps of removing one end portion of said plastic film from said integral bundle prior to joining adjacent ends of said tubing lengths with suitable bonding material and cutting said bundle stepwise commencing at the other end.

References Cited by the Examiner
UNITED STATES PATENTS

| | | | |
|---|---|---|---|
| 2,436,819 | 3/1948 | Neidorf | 51—283 |
| 2,511,962 | 6/1950 | Barnes | 51—283 |
| 2,760,314 | 8/1956 | Heibel et al. | 51—283 |
| 2,967,383 | 1/1961 | Rumsey. | |
| 3,037,620 | 6/1962 | Douty | 206—65 |
| 3,057,472 | 10/1962 | Douty. | |

LESTER M. SWINGLE, *Primary Examiner.*

JOHN C. CHRISTIE, *Examiner.*